US012715772B2

(12) United States Patent
Mohanty et al.

(10) Patent No.: US 12,715,772 B2

(45) Date of Patent: Aug. 25, 2026

(54) HYBRID AUTOMOTIVE PAINT SLUDGE (APS) CHAR PRODUCTS AND METHOD OF MANUFACTURE THEREOF

(71) Applicants: University of Guelph, Guelph (CA); Ford Global Technologies, LLC, Dearborn, MI (US)

(72) Inventors: Amar K. Mohanty, Guelph (CA); Manjusri Misra, Guelph (CA); Arturo Rodriguez, Guelph (CA); Poritosh Roy, Guelph (CA); Neelima Tripathi, Guelph (CA); Michael Snowdon, Guelph (CA); Deborah Frances Mielewski, Ann Arbor, MI (US); Alper Kiziltas, Sarikamis (TR)

(73) Assignees: Ford Global Technologies, LLC, Dearborn, MI (US); University of Guelph, Guelph (CA)

( * ) Notice: Subject to any disclaimer, the term of this patent is extended or adjusted under 35 U.S.C. 154(b) by 329 days.

(21) Appl. No.: 18/485,854

(22) Filed: Oct. 12, 2023

(65) Prior Publication Data

US 2025/0122081 A1 Apr. 17, 2025

(51) Int. Cl.
*C01B 32/05* (2017.01)

(52) U.S. Cl.
CPC .......... *C01B 32/05* (2017.08); *C01P 2004/61* (2013.01)

(58) Field of Classification Search
CPC ............................. C01B 32/05; C01P 2004/61
See application file for complete search history.

(56) References Cited

U.S. PATENT DOCUMENTS

| | | | | |
|---|---|---|---|---|
| 5,129,995 | A | 7/1992 | Agarwal | |
| 5,254,263 | A | 10/1993 | Gerace et al. | |
| 5,543,367 | A | 8/1996 | Narula et al. | |
| 5,880,218 | A | 3/1999 | Gerace et al. | |
| 6,084,003 | A | 7/2000 | Kurple | |
| 8,168,688 | B2 | 5/2012 | Chrzanowski et al. | |
| 10,093,832 | B2 | 10/2018 | Seto | |
| 2005/0266237 | A1 | 12/2005 | Asthana et al. | |
| 2014/0303267 | A1 | 10/2014 | Chrzanowski et al. | |
| 2025/0133636 | A1 * | 4/2025 | Kahlman | H05B 45/325 |

FOREIGN PATENT DOCUMENTS

| | | | |
|---|---|---|---|
| GB | 2135328 | 8/1984 | |
| IN | 107DEL2002 | 12/2005 | |
| WO | 1997018261 | 5/1997 | |
| WO | WO-9951654 A1 * | 10/1999 | C08G 18/4081 |
| WO | 2013112798 | 8/2013 | |

OTHER PUBLICATIONS

Nakouzi, et al., A novel approach to paint sludge recycling: Reclaiming of paint sludge components as ceramic composites and their applications in reinforcement of metals and polymers, Springer Link Abstract, Jan. 31, 2011, 4 pages, full article published in Journal of Materials Research, pp. 53-60, vol. 13, 1998, doi: 10.1557/JMR.1998.0008.

* cited by examiner

*Primary Examiner* — Anthony J Green
(74) *Attorney, Agent, or Firm* — Burris Law, PLLC

(57) ABSTRACT

A method of producing a charred sludge material includes combining automotive paint sludge (APS) with a lignin to form an APS-lignin mixture and turning the APS-lignin mixture into char.

20 Claims, 1 Drawing Sheet

Combining automotive paint sludge with a lignin to form an APS-lignin mixture
20
*Drying the APS-lignin mixture*
22
Turning the APS-lignin mixture into char to form a charred sludge material
24
*Milling the charred sludge material*
26

HYBRID AUTOMOTIVE PAINT SLUDGE (APS) CHAR PRODUCTS AND METHOD OF MANUFACTURE THEREOF

FIELD

The present disclosure relates to paint waste. More specifically, the present disclosure relates to automotive paint sludge (APS).

BACKGROUND

The statements in this section merely provide background information related to the present disclosure and may not constitute prior art.

Automotive paint sludge (APS) is of special concern in the automotive industry due to the large amounts of paint that ends up as chemical waste. Around 20-50% of the paint sprayed onto a passenger car is wasted in an assembly line. Methods are being developed to repurpose and provide a renewed life to the material while reducing a major source of waste. Pyrolysis is a potential method that may provide value-added uses of APS. However, APS initially has a large range of moisture present that varies from batch to batch but can exceed 60% as received. This is not suitable for pyrolysis as the resulting products will have low char yield, and the quality of bio-oil will be reduced with excess water present. Industrially, drying requires significant resources to remove the water from the materials.

Thus, it is desirable to reduce the moisture content of the materials before the thermal treatments. These issues related to APS are addressed in the present disclosure.

SUMMARY

This section provides a general summary of the disclosure and is not a comprehensive disclosure of its full scope or all of its features.

In one form, the present disclosure provides a method of producing a charred sludge material. The method includes combining automotive paint sludge (APS) with a lignin to form an APS-lignin mixture and turning the APS-lignin mixture into char.

In variations of this method, which may be implemented individually or in any combination: the lignin is a lignin powder; the APS-lignin mixture is turned into char by pyrolysis; the APS-lignin mixture is pyrolyzed at temperatures between 400° C. and 1500° C.; the APS-lignin mixture is pyrolyzed at temperatures between 800° C. and 1500° C.; the APS-lignin mixture is dried before turning the dried APS-lignin mixture into char; the APS-lignin mixture is dried at room temperature; the dried APS-lignin mixture has a moisture content less than 10.0%; the charred sludge material is milled to produce particles smaller than 5 microns; and the APS-lignin mixture is 50% automotive paint sludge and 50% lignin powder by weight.

The present disclosure further provides a charred sludge material including automotive paint sludge and lignin powder. The automotive paint sludge and the lignin powder have been pyrolyzed.

In variations of this charged sludge material, which may be implemented individually or in any combination: the material has a particle size of less than 5 microns; and the material is 50% automotive paint sludge and 50% lignin powder by weight.

In yet another form, the present disclosure provides a charred sludge material including automotive paint sludge (APS) and lignin powder. The automotive paint sludge and the lignin powder have been combined to form an APS-lignin mixture. The APS-lignin mixture is dried at room temperature and pyrolyzed to form a charred mixture. The charred mixture is milled to produce particles smaller than 5 microns.

In variations of this charred sludge material, which may be implemented individually or in any combination: the charred mixture is sintered before milling; the APS-lignin mixture is pyrolyzed at temperatures between 400° C. and 1500° C.; the APS-lignin mixture is pyrolyzed at temperatures greater than or equal to 1500° C.; the dried APS-lignin mixture has a moisture content less than 10.0%; and the APS-lignin mixture is 50% automotive paint sludge and 50% lignin powder by weight.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a flow diagram illustrating a method of manufacturing a charred sludge material.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A charred paint material according to the teachings of the present disclosure includes a pyrolyzed mixture of automotive paint sludge and lignin.

As used herein, automotive paint sludge (APS) is a waste paint byproduct of painting automotives. APS is a complex mixture of uncured polymer resins, binders, solvents, pigments, additives and water. APS is sticky with a highly variable water content, in some cases up to 60%. Reducing the moisture content is necessary for further processing. APS can be obtained in two types: a viscous sticky format containing large and variable quantities of water and a 'detackified' quasi-solid form. Either type or a combination may be utilized while remaining within the scope of the present disclosure.

Lignin is an organic biopolymer composed of a complex group of phenolic polymers that confer strength and rigidity to woody cell walls of various plants. Lignin has an equilibrium moisture content of 2-4% and a high capacity to absorb water. The lignin acts as a hygroscopic medium to absorb moisture from the APS. In some forms, the lignin may be a powder.

Once pyrolyzed the APS and lignin have similar plasticization states. As a result, the charred paint material can be used in similar applications to pyrolyzed paint sludge alone, for example, as a component of a composite material.

With reference to FIG. 1, a flow diagram illustrating a process for manufacturing the charred sludge material is shown. The process begins in a block 20, in which automotive paint sludge (APS) is combined with a lignin to form an APS-lignin mixture. The lignin absorbs moisture from the APS, resulting in the reduction of the overall moisture content. In some forms, the lignin is a lignin powder. In some forms, the APS and lignin are mixed under high sheer. High sheer facilitates the absorption of moisture from the APS into the lignin. In various forms, the APS-lignin mixture is 50% automotive paint sludge and 50% lignin powder by weight. In other forms, different ratios of APS to lignin may be used including, but not limited to, 10:90, 20:80, 30:70, 40:60, 50:50, or higher contents of APS. The ratio may be adjusted based on the moisture content of the APS and the final moisture content desired.

In some variations, the APS-lignin mixture is dried, as shown in block 22. The mixture is dried at room temperature. Drying may be utilized depending on the moisture content of the APS and the APS:lignin ratio. In some forms, drying is not necessary as the lignin can absorb enough water to reach the desired moisture content. Drying may be performed in a fume hood or in an open atmosphere. In some forms, the dried mixture has a moisture content less than 10.0%. In some of those forms, the moisture content is less than 5.0%. In some particular forms, the moisture content is less than 3.0%.

Next, in block 24, the APS-lignin is turned into char by pyrolysis. At this point, the charred sludge material is formed. A "pyrolysis" process is a process by which the organic substance is at least partially thermochemically converted into solid carbon in an oxygen-limited environment.

In some forms, the APS-lignin mixture is pyrolyzed at temperatures between 400° C. and 1500° C., including between 400° C. and 1000 C. In one form, the mixture is pyrolyzed at 600° C. Pyrolysis between 800° C. and 1500° C. also results in sintering of the mixture. In some forms, the APS-lignin mixture is pyrolyzed at temperatures greater than or equal to 1500° C., which results in graphitization, in which most or all of the organic material is converted to carbon.

Optionally, in block 26, the charred sludge material is milled to produce particles. The material may be milled by any method, including but not limited to ball milling. In some forms, the particles are less than 5 microns in diameter. In one form, the particles have an average diameter between 700 nm and 900 nm.

Using waste products and plant-based lignin, the charged sludge material is sustainably produced. Because it does not require the use of heating to reduce the moisture, the process allows for a less energy-intensive process for recycling waste paint material.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of producing a charred sludge material comprising:

combining automotive paint sludge (APS) with a lignin to form an APS-lignin mixture; and turning the APS-lignin mixture into char.

2. The method of claim 1, wherein the lignin is a lignin powder.

3. The method of claim 1, wherein the APS-lignin mixture is turned into char by pyrolysis.

4. The method of claim 3, wherein the APS-lignin mixture is pyrolyzed at temperatures between 400° C. and 1500° C.

5. The method of claim 4, wherein the APS-lignin mixture is pyrolyzed at temperatures between 800° C. and 1500° C.

6. The method of claim 3, wherein the APS-lignin mixture is pyrolyzed at temperatures greater than or equal to 1500° C.

7. The method of claim 1, further comprising drying the APS-lignin mixture before turning the dried APS-lignin mixture into char.

8. The method of claim 7, wherein the APS-lignin mixture is dried at room temperature.

9. The method of claim 7, wherein the dried APS-lignin mixture has a moisture content less than 10.0%.

10. The method of claim 1, further comprising milling the charred sludge material to produce particles smaller than 5 microns.

11. The method of claim 1, wherein the APS-lignin mixture is 50% automotive paint sludge and 50% lignin powder by weight.

12. A charred sludge material comprising:

automotive paint sludge, and lignin powder, the automotive paint sludge and lignin powder having been pyrolyzed.

13. The material of claim 12, wherein the material has a particle size of less than 5 microns.

14. The material of claim 12, wherein the material is 50% automotive paint sludge and 50% lignin powder by weight.

15. A charred sludge material comprising:

automotive paint sludge (APS); and lignin powder, the APS and lignin powder being combined to form an APS-lignin mixture, the APS-lignin mixture being dried at room temperature and pyrolyzed to form a charred mixture, the charred mixture being milled to produce particles smaller than 5 microns.

16. The material of claim 15, wherein the charred mixture is sintered before milling.

17. The material of claim 15, wherein the APS-lignin mixture is pyrolyzed at temperatures between 400° C. and 1500° C.

18. The material of claim 15, wherein the APS-lignin mixture is pyrolyzed at temperatures greater than or equal to 1500° C.

19. The material of claim 15, wherein the dried APS-lignin mixture has a moisture content less than 10.0%.

20. The material of claim 15, wherein the APS-lignin mixture is 50% automotive paint sludge and 50% lignin powder by weight.

* * * * *